(12) United States Patent
Eiger et al.

(10) Patent No.: US 6,306,933 B1
(45) Date of Patent: Oct. 23, 2001

(54) CELLULOSE ETHER SLURRIES

(75) Inventors: Luiz Roberto Eiger, São Paulo (BR); Emmett Malone Partain, III, Bound Brook; Arthur Herbert Marsh, Edison, both of NJ (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/281,478

(22) Filed: Mar. 30, 1999

(51) Int. Cl.$^7$ .............................. C08K 9/00; C08L 1/10; C08L 1/14
(52) U.S. Cl. ............................ 523/205; 524/37; 524/38; 524/41
(58) Field of Search ............................... 523/205; 524/37, 524/38, 41

(56) References Cited

U.S. PATENT DOCUMENTS 4,325,861   4/1982   Braun et al. ..................... 523/205

FOREIGN PATENT DOCUMENTS

| 19525870 | 1/1997  | (DE) . |
| 0039128  | 11/1981 | (EP) . |
| 0455073  | 11/1991 | (EP) . |
| 0839888  | 5/1998  | (EP) . |
| 45355    | 10/1998 | (WO) . |

*Primary Examiner*—Kriellion Sanders
(74) *Attorney, Agent, or Firm*—W. K. Volles

(57) ABSTRACT

Slurries of water soluble cellulose ethers are disclosed. The slurries comprise particulate cellulose ethers in an oxygenated, organic carrier which is substantially a non-solvent for the cellulose ethers, a thickening agent and optionally surfactants and other ingredients. The ingredients contained in the slurries are compatible with the ingredients used in the manufacture of latex compositions, e.g., latex paints.

12 Claims, No Drawings

CELLULOSE ETHER SLURRIES

FIELD OF THE INVENTION

The present invention relates to slurries of water soluble polymers. More specifically, the present invention relates to slurries of water soluble cellulose ethers in oxygenated, organic carriers.

BACKGROUND OF THE INVENTION

Cellulose ethers have been used commercially in a variety of applications. Typical industrial applications for cellulose ethers include, for example, use as viscosity adjusters, suspension aids, oil field drilling and fracturing materials, adhesion promoters for siliceous substrates, e.g., glass panels and ceramics, coating materials for plastic and metal substrates, protective colloids and building materials, e.g., wallboard compound and latex grout additive. Typical personal care applications include, for example, pharmaceutical and cosmetic compositions, e.g., ointments, skin creams, lotions, soaps, shampoos, conditioners and the like.

One predominant use for cellulose ethers is in the latex industry where the cellulose ethers are utilized as thickeners. In latex paint, cellulose ethers generally provide excellent thickening efficiency and other properties while being substantially inert to the latexes, surfactants and coalescing agents commonly used in latex paints.

Cellulose ethers, such as for example, hydroxyethyl cellulose, are generally sold as dry powders. The final compositions which comprise the cellulose ethers are often liquids. The dry powdered cellulose ethers are typically incorporated into the final liquid compositions by the formulators of the liquid products. In general, solids are more difficult to measure, dissolve, transfer and store than liquids. In contrast, liquids generally dissolve more smoothly and are easier to transfer, i.e., can be pumped, than solids.

Aqueous slurries of cellulose ethers have been proposed whereby high concentrations of salt,. e.g., sodium formate, potassium carbonate or diammonium phosphate, are used to sufficiently reduce the water solubility of the cellulose ether to provide a suspension of cellulose ether particles in the carrier. However, such salt-containing slurries have not achieved widespread use in the latex industry, particularly the latex paint industry because the high salt concentration in the slurry is deleterious to the final dried paint film as the salt impairs the weatherability, adhesion and water resistance of the coating.

Accordingly, improved cellulose ether slurries are desired which do not require the use of high concentrations of salt in order to disperse the cellulose ether. In addition, it is desired that the slurries provide high concentrations, e.g., greater than 30 weight percent, of the cellulose ether. It is further desired that the other ingredients in the slurry, e.g., the carrier, be compatible and beneficial to the final composition in which the slurry is employed.

SUMMARY OF THE INVENTION

By the present invention, slurries of cellulose ethers and processes for making and using the cellulose ethers are provided. The cellulose ether slurries of the present invention comprise a cellulose ether and an oxygenated, organic carrier which is substantially a non-solvent for the cellulose ether. The cellulose ether slurries of the present invention can be prepared to be substantially free of salt and water.

Quite advantageously, the cellulose ether slurries of the present invention comprise ingredients, e.g., the oxygenated, organic carrier, thickener, surfactants and the like, which are commonly used in the preparation of latex compositions, e.g., paints. Moreover, quite surprisingly in accordance with the present invention, the use of the organic, oxygenated carrier can provide significant performance advantages in latex compositions as compared to slurries made using other carriers, such as, for example, hydrocarbons. Moreover, the cellulose ether slurries of the present invention can provide formulators greater efficiency in production and simpler hardware and manpower requirements as compared to using cellulose ethers in a dry powder form.

DETAILED DESCRIPTION OF THE INVENTION

Cellulose ethers suitable for use in accordance with the present invention include etherified derivatives of cellulose. Typical cellulose ethers include for example, hydroxyethyl cellulose, hydroxypropyl cellulose, methyl cellulose, hydroxypropyl methyl cellulose, hydroxyethyl methyl cellulose, hydroxyethyl carboxymethyl cellulose, and the like. Preferred cellulose ethers include hydroxyethyl cellulose and ethyl hydroxyethyl cellulose.

Ether substituents suitable for use in accordance with the present invention comprise ethers preferably having 2 to 4 carbon atoms per molecule. Typically, the ether substituent is derivatized onto the cellulose by reacting the cellulose with an alkylene oxide, preferably ethylene oxide. The amount of ether substitution is typically from about 1.5 to G and preferably from about 2 to 4 moles of ether substituent per mole of cellulose ether. Further details concerning the manufacture of such cellulose ethers are known to those skilled in the art.

The molecular weight of the cellulose ethers suitable for use in accordance with the present invention typically ranges from about 10,000 to $2 \times 10^6$ grams per gram mole and preferably ranges from about 70,000 to $1 \times 10^6$ grams per gram mole. As used herein, the term "molecular weight" means weight average molecular weight. Methods for determining weight average molecular weight of cellulose ethers are known to those skilled in the art. One preferred method for determining molecular weight is low angle laser light scattering. The viscosity of the cellulose ethers typically ranges from about 5 to 6000 centipoise, preferably from about 100 to 3000 centipoise. Unless otherwise indicated, as used herein the term "viscosity" refers to the viscosity of a 1.0 weight percent aqueous solution of the polymer measured at 25° C. with a Brookfield viscometer. Such viscosity measuring techniques are known in the art and are described in ASTM D 2364-89. The average particle size of the cellulose ethers is not critical, but is preferably from about 0.01 to 1000 microns and more preferably from about 50 to 400 microns.

The cellulose ethers may be substituted with one or more hydrophobic substituents. Such hydrophobic substituents are known in the art and typically comprise alkyl, alkene, aryl-alkene or aryl-alkyl groups having about 8 to 24 carbon atoms per molecule. Such hydrophobically-modified cellulose ethers are described, for example, in U.S. Pat. Nos. 4,228,277; 5,120,328 and 5,504,123 and European Patent Publication 0 384 167 B1.

The substitution level of the hydrophobic substituents on the cellulose ether is typically from about 0.001 to 0.1 and preferably from about 0.004 to about 0.05 moles of the hydrophobic substituent per mole of cellulose ether. More than one particular hydrophobic substituent can be substituted onto the cellulose ether provided that the total substitution level is within the desired range.

The ionic character of the cellulose ethers of the present invention is not critical. It is typically preferred however that the ionic charge be anionic and more preferably nonionic. Cationic cellulose ethers are often undesirable in latex compositions since they can cause agglomeration and flocculation with anionic ingredients, e.g., anionic polyacrylate dispersants, anionic maleic acid copolymer dispersants, and sodium sulfosuccinate surfactants often found in latex compositions. Further details concerning the substituents and methods for modifying the ionic character of cellulose ethers are known to those skilled in the art.

The cellulose ether derivatives of the present invention are water-soluble. As used herein, the term "water-soluble" means that at least 1 gram, and preferably at least 2 grams of the cellulose ether derivative are soluble in 100 grams of distilled water at 25° C. and 1 atmosphere. The extent of water-solubility can be varied by adjusting the extent of ether substitution on the cellulose ether and by adjusting the substitution level of the hydrophobic substituents, when present. Techniques for varying the water solubility of cellulose ethers are known to those skilled in the art.

The amount of the cellulose ether in the slurries of the present invention is typically from about 1 to 75 weight percent, preferably from about 5 to 60 weight percent, more preferably from about 20 to 60 weight percent and most preferably from about 30 to 50 weight percent, based on the total weight of the slurry.

Cellulose ethers suitable for use in accordance with the present invention are commercially available from, for example, Union Carbide Corporation, Danbury, Conn.

The oxygenated, organic carriers suitable for use in accordance with the present invention, include any oxygenated organic compounds which are substantially non-solvents for the cellulose ether. As used herein, the term "non-solvent" means compounds which do not dissolve or substantially swell the cellulose ether. Preferably, the oxygenated organic solvents will comprise from about 2 to 12 carbon atoms per molecule.

Preferably, the oxygenated, organic carrier is selected from the group consisting of ketones, carbonates, esters, ester alcohols, glycol ethers, glycols and mixtures thereof. Examples of suitable oxygenated, organic carriers include ketones such as methyl ethyl ketone, methyl i-butyl ketone, and methyl n-propyl ketone; carbonates such as propylene carbonate and ethylene carbonate; esters such as ethyl propionate and n-propyl propionate; ester alcohols such as 2-ethoxyethyl acetate, e.g., ethyl CELLOSOLVE® acetate available from Union Carbide Corporation, Danbury, Conn., diethylene glycol monobutyl ether acetate, e.g., EASTMAN® DB acetate available from Eastman Chemical Company, Kingsport, Tenn., 2-ethoxyethyl acrylate, 2,2,4-trimethyl-1,3-pentanediol monoisobutyrate, e.g., Texanol™ available from Eastman Chemical Company, Kingsport, Tenn. or UCAR® Filmer IBT, available from Union Carbide Corporation, Danbury, Conn., 1,2-propanediol-mono-2-ethyl hexanoate, e.g., SER-AD™ FX 511 available from Huls America Inc., Somerset, N.J.; glycol ethers such as di(propylene glycol) butyl ether, e.g., butyl PROPASOL® available from Union Carbide Corporation, Danbury, Conn., di(propylene glycol) propyl ether, e.g., propyl PROPASOL® available from Union Carbide Corporation, Danbury, Conn., di(ethylene glycol) butyl ether, e.g., butyl CARBITOL® available from Union Carbide Corporation, Danbury, Conn., di(ethylene glycol) propyl ether, e.g., propyl CARBITOL available from Union Carbide Corporation, Danbury, Conn., ethylene glycol butyl ether, e.g., butyl CELLOSOLVE® available from Union Carbide Corporation, Danbury, Conn., ethylene glycol ethyl ether, e.g., ethyl CELLOSOLVE® available from Union Carbide Corporation, Danbury, Conn., diethylene glycol mono-n-hexyl ether, e.g., UCAR® Filmer ECH, available from Union Carbide Corporation, Danbury, Conn., ethylene glycol phenyl ether, e.g., DOWANOL® EPh available from Dow Chemical Company, Midland, Mich., propylene glycol phenyl ether, e.g., DOWANOL® PPh available from Dow Chemical Company, Midland, Mich., monoglyme (ethylene glycol dimethyl ether), and diglyme (2-methoxyethyl ether); and glycols such as hexylene glycol and butylene glycol. These oxygenated solvents, many of which are used as coalescing agents in latex paints, are described, for example, by A. J. DeFusco, in *Modern Paint & Coatings,* 56, November, 1989.

The amount of the oxygenated, organic carrier suitable for use in accordance with the present invention is typically from about 25 to 99 weight percent, preferably from about 30 to 80 weight percent, more preferably from about 40 to 75 weight percent and most preferably from about 50 to 70 weight percent, based on the total weight of the slurry.

The particulate, thickening agents suitable for use in accordance with the present invention include any particulate materials which can function to thicken the slurry, and are compatible with the slurry and nonreactive with the cellulose ether. Preferably, small amounts of the particulate thickening agent will have the ability to greatly thicken the carrier and/or to coat the cellulose ether thereby preventing stratification of the cellulose ether during extended periods of time such as during storage and transit. Preferably, the particulate thickening agents used in the present invention comprise materials which are insoluble in the carrier and preferably comprise at least one particulate metal or metalloid oxide powder, such as, for example, silica, alumina, alumina hydrates or clay, e.g., montmorillonites, attapulites, hectorites, and bentonites, and mixtures thereof The particulate thickening agents may be hydrophilic or hydrophobic, i.e., surface modified with a hydrophobic agent. Suitable particulate thickening agents are commercially available. Examples include organobentonite clays, e.g., BENTONE® SD-2 available from Rheox Inc., Hightstown, N.J., fumed hydrophilic silica, e.g., CAB-O-SIL® M-5 available from Cabot Corporation, Tuscola, Ill., fumed hydrophobic silica, e.g., CAB-O-SIL® TS-530 available from Cabot Corporation, Tuscola, Ill., and attapulgite clay, e.g., ATTA-GEL® available from Engelhard Industries, Edison, N.J. More than one thickening agent may be used in accordance with the present invention.

The thickening agent is dispersed in the oxygenated organic carrier to viscosity this fluid, and best results are usually obtained by dispersing the thickening agent under high shear conditions. Simple, low shear mixing of the thickening agent and the oxygenated organic carrier may not be sufficient to obtain maximum fluid viscosity to prevent settling or stratification of the suspended cellulose ether. The use of a Cowles-type high shear mixer is preferred in the preparation of these slurries, but other high shear mixing equipment is also suitable. In the absence of a Cowles-type high shear mixer, a simple turbine stirrer can be used to prepare the slurries of this invention, but the oxygenated organic carrier should be heated to between about 40° C. to 80° C. prior to the addition of the thickening agent to facilitate the dispersion and viscosification of the thickening agent. The cellulose ether and surfactant can then be added at 25° C. with simple stirring.

The amount of the thickening agents used in the slurries of the present invention is typically from about 0.1 to 10 weight percent and preferably from about 1 to 5 weight percent, based on the total weight of the slurry.

The cellulose ether slurries of the present invention also typically comprise a surfactant. The surfactant is preferably one that enhances the dissolution, i.e., wetting of the polymer. The ionic carrier of the surfactant is not critical although non-ionic and anionic surfactants are generally preferred.

Suitable surfactants are commercially available. Examples include octyl phenol ethoxylates, e.g., TRITON® X-114 available from Union Carbide Corporation, Danbury, Conn., nonyl phenol ethoxyates, e.g., TERGITOL® NP-10 available from Union Carbide Corporation, Danbury, Conn., ethoxylated sorbitan esters, e.g., TWEEN® 60 available from ICI Incorporated, Wilmington, Del., primary alkyl alcohol ethoxylates, e.g., NEODOL® 25-12 available from Shell Chemicals, Houston, Tex., ethylene oxide/propylene oxide block copolymers, e.g., PLURONIC® P104 available from BASF, Holland, Mich., and polyethylene glycol alkyl esters.

When utilized in the slurries of the present invention, the concentration of the surfactant typically ranges from about 0.1 to 10 weight percent, based on the total weight of the slurry.

The slurry compositions of the present invention can also contain additional ingredients known in the art such as, for example, biocides, dyes, colors, perfumes, anti-foam and the like. The amount of such other ingredients is typically be from about 0 to 1 weight percent, preferably from about 5 to 5,000 ppm, based on the total weight of the slurry.

The slurries of the present invention can be prepared by combining the cellulose ether, oxygenated organic carrier and particulate thickening agent by mixing techniques known to those skilled in the art. A preferred method for preparing the slurries in accordance with the present invention comprises dispersing the particulate thickening agent in the oxygenated, organic carrier to form an initial dispersion and then adding the cellulose ether to the initial dispersion to form the slurry. Surfactants and additional ingredients can be added at any convenient time.

Preferably, the slurries of the present invention are stable for a period of at least one week, more preferably at least two weeks and most preferably at least one month. As used herein, the term "stable" means that the cellulose ether particles will remain substantially dispersed in the oxygenated, organic carrier. Although there may be some settling of the cellulose ether particles, they can be easily redispersed with slight agitation.

Preferably, the viscosity of the cellulose ether slurries of the present invention is from about 100 to 5000 centipoise, preferably from about 300 to 1000 centipoise at a shear rate of about 10 sec$^{-1}$. The cellulose ether slurries of the present invention preferably also have a viscosity of between about 5000 cP and 30.000 cP at a shear rate of about 2.3 sec$^{-1}$. It is also preferred that the viscosity of the slurries of the present invention is such that the slurries are pumpable and pourable. The typical Stormer viscosities of the slurries described in the present invention vary between 80 and 110 KU.

Preferably, the slurries of the present invention are substantially free of salt, e.g., sodium formate, potassium carbonate or diammonium phosphate. It is also preferred that the slurries are substantially free of water, i.e., non-aqueous. As used herein, the term "substantially free" means that there is less than about 5 weight percent, preferably less than about 2 weight percent, more preferably less than about 1 weight percent and most preferably less than about 0.5 weight percent of the salt or water, as the case may be.

The cellulose ether derivatives of the present invention have a variety of end-use applications, such as, for example, industrial applications and personal care applications. Typical industrial applications for cellulose ethers include, for example, use as viscosity adjusters, suspension aids, oil field drilling and fracturing materials, adhesion promoters for siliceous substrates, e.g., glass panels and ceramics, coating materials for plastic and metal substrates, protective colloids and building materials, e.g., wallboard compound and latex grout additive. Typical personal care applications include, for example, pharmaceutical and cosmetic compositions, e.g., ointments, skin creams, lotions, soaps, shampoos, conditioners and the like.

A preferred end-use application for cellulose ether derivatives of the present invention is as an additive in latex compositions.

Typical latex compositions comprise as essential components: water; latex polymer; and the cellulose ether. The kind and amount of latex polymer is not critical, and may be provided based on well established procedures. Typical latex polymers include, but are not limited to, various types such as the following: acrylics; alkyds; celluloses; coumaroneindenes; epoxys, esters; hydrocarbons; maleics' melamines; natural resins; oleo resins; phenolics; polyamides; polyesters; rosins; silicones; styrenes; terpenes; ureas; urethanes; vinyls; vinyl acrylics; and the like. Illustrative latex polymers include, but are not limited to, one or more homo- or copolymers containing one or more of the following monomers: (meth)acrylates; vinyl acetate; styrene; ethylene; vinyl chloride; butadiene; vinylidene chloride; vinyl versatate; vinyl propionate; t-butyl acrylate; acrylonitrile; neoprene; maleates; fumarates; and the like, including plasticized or other derivatives thereof.

The amount of cellulose ether which may be used in the latex composition is not narrowly critical. In the broadest sense, the amount of cellulose ether is that which is an effective amount in promoting crosslinking while preferably providing the desired thickening and rheological properties to the latex composition. Typically, the amount of cellulose ether is at least about 0.05, preferably from about 0.15 to about 3, and more preferably from about 0.25 to about 1.5 weight percent of the latex composition.

The selection and amount of latex polymer used in the latex composition can be determined by those skilled in the art is not critical. Typically, the amount of dry latex polymer is at least about 1, preferably from about 2 to about 50, and most preferably from about 3 to about 40 weight percent of the total latex composition.

The latex composition may optionally contain other components such as those generally used in latex compositions. Typical components include, but are not limited to, one or more of the following: solvents such as aliphatic or aromatic hydrocarbons, alcohols, esters, ketones, glycols, glycol ethers, nitroparaffins or the like; pigments; fillers, dryers, flatting agents; plasticizers; stabilizers; dispersants; surfactants; viscosifiers including other polymeric additives, cellulose ether based thickeners and so on; suspension agents; flow control agents; defoamers; anti-skinning agents; preseratives; extenders; filming aids; other crosslinkers; surface improvers; corrosion inhibitors; and other ingredients useful in latex compositions.

Further details concerning the preparation of latex compositions are known to those skilled in the art. The cellulose ether slurries of the present invention can be added to latex paint, for example, during their manufacture during the pigment grind (mill base) step, let-down step, or both.

Quite surprisingly in accordance with the present invention, the use of the organic, oxygenated carrier can provide significant performance advantages in latex compositions as compared to slurries made using other carriers, such as, for example, hydrocarbons. More specifically, slurries made using a liquid hydrocarbon, e.g., naphtha, mineral oils, kerosenes, Diesel fuel, and TELURA® 415 hydrocarbon oil (from Exxon Chemical Company, Houston, Tex.), are not preferred when the slurries are incorporated into latex compositions as described above. These hydrocarbons are poor latex coalescing agents and therefore yield poor dried paint films, they are incompatible with many latex paint ingredients (including water), they tend to phase-separate from water-borne systems, and many have objectionable odors.

The following examples are provided illustrative purposes and are not intended to limit the scope of the claims which follow. Unless stated otherwise, all percentages correspond to weight percent.

EXAMPLES

The designations and abbreviations used in the examples are defined as follows:

| | |
|---|---|
| TAMOL® 731 dispersant | An anionic polymer dispersant, available from Rohm & Haas, Philadelphia, PA. |
| KTPP | Potassium tripolyphosphate, available from FMC, Philadelphia, PA. |
| TERGITOL® NP-10 surfactant | A nonyl phenol ethoxylate non-ionic surfactant, available from Union Carbide, Danbury, CT. |
| COLLOIDS® 643 antifoam | A silica/petroleum dispersion, available from Rhone-Poulenc, Kennesaw, GA. |
| AMP-95 | 2-Amino-2-methyl-1-propanol, available from Angus Chemical Company, Buffalo Grove, IL. |
| TI-PURE® R-931 rutile | Titanium dioxide (rutile), available from DuPont, Wilmington, DE. |
| SATINTONE #1 calcined clay | An aluminum silicate, available from Engelhard Industries, Edison, NJ. |
| SNOWFLAKE WHITE® calcium carbonate | Calcium carbonate, available from ECC America, Sylacauga, AL. |
| UCAR® 6379 vinyl-acrylic latex | A vinyl acetate/butyl acrylate copolymer latex, available from UCAR® Emulsion Systems, Cary, NC. |
| UCAR® Filmer IBT | 2,2,4-Trimethyl-1,3-pentanediol monoisobutyrate, available from Union Carbide, Danbury, CT. |
| TRITON® GR-7M surfactant | A sodium sulfosuccinate anionic surfactant, available from Union Carbide, Danbury, CT. |
| TAMOL® 960 dispersant | An anionic polymer dispersant, available from Rohm & Haas, Philadelphia, PA. |
| NOPCO® NXZ antifoam | A silica/mineral oil dispersion, available from Henkel Corporation, Amber, PA. |
| TRITON® CF-10 surfactant | A alkylaryl polyether nonionic surfactant, available from Union Carbide, Danbury, CT. |
| TI-PURE® R-902, rutile | Titanium dioxide (rutile), available from DuPont, Wilmington, DE. |
| Zinc Oxide, XX 631R | Zinc Corporation of America, Palmerton, PA. |
| Silver Bond B™ silica | Silica available from Unimin Specialty Minerals, Havelock, Ontario (Canada). |
| ATTAGEL® 50 clay | Attapulgite clay, available from Engelhard Industries, Edison, NJ. |
| UCAR® 624 all-acrylic latex | An acrylate ester copolymer latex available from UCAR® Emulsion Systems, Cary, NC. |
| SKANE® M-8 biocide | 2-n-Octyl-4-isothiazolin-3-one, EPA registry 707-100-AA, available from Rohm & Haas, Philadelphia, PA. |

-continued

| | |
|---|---|
| NUOSEPT® 95 biocide | A bicyclic oxazolidine, EPA registry 1100-82, available from Huls America, Piscataway, NJ. |
| TI-PURE® R-900, rutile | Titanium dioxide (rutile), available from DuPont, Wilmington, DE. |
| TAMOL® SG-1 dispersant | An anionic polymer dispersant, available from Rohm & Haas, Philadelphia, PA. |
| SYLOID® 244 amorphous silica | Silica available from Davison Chemical, Division of W. R. Grace, Baltimore, MD. |
| RHOPLEX® AC-417M all-acrylic latex | An acrylic ester copolymer latex available from Rohm & Haas, Philadelphia, PA. |
| CELLOSIZE® HEC | Hydroxyethyl cellulose polymer available from Union Carbide, Danbury, CT. |
| CELLOSIZE® HM HEC 200 | An experimental alkyl aryl modified hydroxyethyl cellulose having an EO MS of about 3.5 and a hydrophobe DS of about 0.01 |
| NATROSOL® Plus 330 HMHEC | A linear hexadecyl modified hydroxyethyl cellulose having an EO MS of about 3.5 and a hydrophobe DS of about 0.01 available from Aqualon Company, Wilmington, DE. |
| NATROSOL® 250 H4BR HEC | An enzyme resistant hydroxyethyl cellulose polymer available from Aqualon Company, Wilmington, DE. |
| BERMOCOLL® EBS 481 FQ EHEC | An enzyme resistant ethyl hydroxyethyl cellulose polymer available from Berol Nobel AB, Stenungsund, Sweden. |

The following test procedures define the performance tests used in the latex paint evaluation.

Stormer viscosity: ASTM Method D) 562-81.

ICI viscosity: Viscosity, in poise, measured on the final latex paint formulation using an ICI Cone and Plate Viscometer, Model VR-4000. ASTM Method D 4287-88.

Sag resistance: ASTM Method D 4400-84.

Leveling: ASTM Method D 4062-81.

Spatter resistance: ASTM Method D 4707-87.

Example 1

A slurry is prepared by mixing 14.0 g of UCAR® Filmer IBT solvent and 1.0 g of BENTONE® SD-2 organobentonite clay using a Cowles disperser for 10 minutes at 2000 rpm. 6.0 g of CELLOSIZE® HEC QP-52MH is added and mixed at 4000 rpm for 10 minutes, then 0.3 g of TERGITOL® NP-10 surfactant is added and the mixture is stirred at 4000 rpm for 10 minutes. The final mixture is a fluid tan slurry with a final HEC content of 28.2% and a UCAR® Filmer IBT content of 65.7%.

Example 2

A slurry is prepared by mixing 14.0 g of UCAR® Filmer IBT solvent and 1.0 g of BENTONE® SD-2 organobentonite clay using a Cowles disperser for 10 minutes at 2000 rpm. 6.0 g of CELLOSIZE® HEC QP-52MH is added and mixed at 4000 rpm for 10 minutes, then 0.6 g of TERGITOL® NP-10 surfactant is added and the mixture is stirred at 4000 rpm for 10 minutes. The final mixture is a fluid tan slurry with a final HEC content of 27.8% and a UCAR® Filmer IBT content of 64.8%.

Example 3

Same procedure as example 1 except that CELLOSIZE® HEC ER-52M was used instead of CELLOSIZE® HEC QP-52MH.

Example 4

Same procedure as example 1 except that CELLOSIZE® HEC ER-52M was used instead of CELLOSIZE® HEC QP-52MH.

Examples 5–20

The slurries from Examples 1–4 were used to prepare latex paints. Control experiments were conducted using latex paints prepared with the corresponding powdered cellulose ether polymers as indicated in Tables 1, 2, and 3. In the case of the slurries, the general procedure used to prepare the latex paints was the same in that the same total solids of cellulose ether polymer was used and the quantity of UCAR® Filmer IBT added in the let-down was reduced to compensate for the UCAR® Filmer IBT added with the slurry so that the total UCAR® Filmer IBT content was the same.

The compositions of the latex paints utilized in Examples 5–20 is shown below in Tables 1, 2 and 3. The paint in Table 1 is an interior vinyl-acrylic flat in which the cellulose ether/cellulose ether slurry is added in the pigment grind step. The paint in Table 2 is an exterior all-acrylic flat in which the cellulose ether/cellulose ether slurry is added partially in the pigment grind step and partially in the let-down step. The paint in Table 3 is an interior all-acrylic semi-gloss in which all of the cellulose ether/cellulose ether slurry is added in the let-down step.

TABLE 1

Examples 5–10
Interior Vinyl-acrylic Flat

| | Powdered HEC Mass (g) | Slurry HEC Mass (g) |
|---|---|---|
| Pigment grind | | |
| Water | 100.0 | 100.0 |
| TAMOL ® 731 dispersant | 4.2 | 4.2 |
| KTPP | 0.25 | 0.25 |
| TERGITOL ® NP-10 nonyl phenol ethoxylate | 1.0 | 1.0 |
| COLLOIDS ™ 643 antifoam | 1.25 | 1.25 |
| NUOSEPT ™ 95 biocide | 1.0 | 1.0 |
| HEC dry powder | 3.0 | — |
| HEC slurry of example 2 | — | 10.0 |
| AMP-95 | 0.5 | 0.5 |
| Water | 70.0 | 70.0 |
| Mix for 5 minutes | | |
| Propylene glycol | 9.0 | 9.0 |
| TI-PURE ® R-931 rutile | 75 | 75 |
| SATINTONE #1 calcined clay | 62.5 | 62.5 |
| SNOWFLAKE WHITE calcium carbonate | 100 | 100 |
| Water | 10.0 | 10.0 |
| Grind for 30 minutes | | |
| Let-down | | |
| UCAR ® Latex 6379 | 112.5 | 112.5 |
| UCAR ® Filmer IBT | 6.0 | — |
| TRITON ® GR-7M surfactant | 0.5 | 0.5 |
| COLLOIDS ™ 643 antifoam | 1.25 | 1.25 |
| Water | 20.0 | 20.0 |
| Total | 577.95 g | 578.95 g |

TABLE 2

Examples 11–13
Exterior Acrylic Tint Base

| | Powdered HEC Mass (g) | Slurry HEC Mass (g) |
|---|---|---|
| Pigment grind | | |
| (Premixed powdered HEC & | 1.00 | — |
| (Propylene glycol | 10.0 | — |
| HEC slurry of example 4 | — | 3.60 |
| Propylene glycol | — | 10 0 |
| TAMOL ® 960 dispersant | 3.95 | 3.95 |
| KTPP | 0.75 | 0.75 |
| NOPCO ™ NXZ antifoam | 0.5 | 0.5 |
| TRITON ® CF-10 surfactant | 1.25 | 1.25 |
| Water | 79 | 79 |
| Rutile, TI-PURE ® R-902 | 85 | 85 |
| Zinc oxide | 25 | 25 |
| Silica, Silver Bond B ™ | 104 | 104 |
| Grind for 5 minutes | | |
| ATTAGEL ™ 50 clay | 5.0 | 5.0 |
| Grind for 10–15 minutes | | |
| Let-down | | |
| UCAR ® Latex 624 | 223 | 223 |
| NOPCO ™ NXZ antifoam | 1.0 | 1.0 |
| UCAR ® Filmer IBT | 6.7 | 2.04 |
| Propylene glycol | 24 | 24 |
| SKANE ™ M-8 biocide | 1.0 | 1.0 |
| 2.0% slurry of HEC powder and water | 50.25 | — |
| HEC slurry of example 4 | — | 3.60 |
| Water | — | 49.0 |
| Total | 621.40 g | 621.69 g |

TABLE 3

Examples 17–20
Interior White Semi-gloss

| | Powdered HEC Mass (g) | Slurry HEC Mass (g) |
|---|---|---|
| Pigment grind | | |
| Propylene glycol | 40.0 | 40.0 |
| TAMOL ® SG-1 | 4.25 | 4.25 |
| Nopco NXZ antifoam | 1.00 | 1.00 |
| Rutile, TI-PURE ® R-900 | 120.0 | 120.0 |
| SYLOID ® 244 amorphous silica | 12.5 | 12.5 |
| Water | 12.5 | 12.5 |
| Grind for 20 minutes | | |
| Let-down | | |
| RHOPLEX ® AC-417M (48% solids) | 250.0 | 250.0 |
| Nopco NXZ antifoam | 1.35 | 1.35 |
| Propylene glycol | 5.00 | 5.00 |
| UCAR ® Filmer IBT | 10.80 | 8.17 |
| Nuosept ™ 95 biocide | 1.00 | 1.00 |
| TRITON ® GR-7M surfactant | 0.25 | 0.25 |
| 2.1% Aqueous solution of HEC powder | 84.5 | — |
| HEC slurry of example 15 | — | 4.49 |
| Water | — | 82.0 |
| Total | 543.15 g | 542.51 g |

Examples 5–7

Interior flat with UCAR® latex 6379 vinyl-acrylic latex at 6 pounds QP-52MH HEC (contained) per 100 gallons. The rheological performance of the two slurries was identical to that of powdered QP-52MH (see Table 4 below).

TABLE 4

Rheological Performance

| Parameter | Example 5<br>Powdered QP-52MH | Example 6<br>Slurry from example 1 | Example 7<br>Slurry from example 2 |
|---|---|---|---|
| Stormer viscosity | 85 KU | 84 KU | 86 KU |
| ICI viscosity | 1.2 P | 1.2 P | 1.2 P |
| Sag resistance | 14 | 15 | 14 |
| Leneta leveling | 1 | 2 | 1 |
| Spatter resistance | 7 | 7 | 7 |

Examples 8–10

Interior flat with UCAR® latex 6379 vinyl-acrylic latex at 6 pounds ER-52M HEC (contained) per 100 gallons. The rheological performance of the two slurries in latex paint was identical to that of powdered ER-52M (see table below).

TABLE 5

Rheological Performance

| Parameter | Example 8<br>Powdered ER-52M | Example 9<br>Slurry from example 3 | Example 10<br>Slurry from example 4 |
|---|---|---|---|
| Stormer viscosity | 83 KU | 85 KU | 83 KU |
| ICI viscosity | 1.2 P | 1.2 P | 1.2 P |
| Sag resistance | 16 | 13 | 14 |
| Leneta leveling | 1 | 1 | 1 |
| Spatter resistance | 6 | 6 | 6 |

Examples 11–13

Exterior all-acrylic flat with UCAR® latex 624 acrylic latex at 4 pounds ER-52M HEC (contained) per 100 gallons. The rheological performance of the two slurries in latex paint was identical to that of the powdered ER-52M (see table below).

TABLE 6

Rheological Performance

| Parameter | Example 11<br>Powdered ER-52M | Example 12<br>Slurry from example 3 | Example 13<br>Slurry from example 4 |
|---|---|---|---|
| Stormer viscosity | 91 KU | 90 KU | 91 KU |
| ICl viscosity | 1.1 P | 1.1 P | 1.2 P |
| Sag resistance | 15 | 15 | 15 |
| Leneta leveling | 2 | 2 | 2 |
| Spatter resistance | 1 | 1 | 1 |

Example 14

A slurry is prepared by mixing 36.0 g of UCAR® Filmer IBT solvent and 0.6 g of CAB-O-SIL® M-5 fumed hydrophilic silica using a Cowles disperser for 5 minutes. 24.0 g of CELLOSIZE® HEC QP-4400H is added, and the mixture is stirred for another 5 minutes. The final slurry is 39.6% HEC.

Example 15

A slurry is prepared by mixing 36.0 g of UCAR® Filmer IBT solvent and 0.6 g of CAB-O-SIL® M-5 fumed hydrophilic silica using a Cowles disperser for 5 minutes. 24.0 g of CELLOSIZE® HEC QP-4400H is added, and the mixture is stirred for another 5 minutes. 0.9 g of TERGITOL® NP-10 surfactant is added and the slurry is stirred for 1 more minute. The final slurry is 39.0% HEC.

Example 16

A slurry is prepared by mixing 36.0 g of UCAR® Filmer IBT solvent and 0.6 g of CAB-O-SIL® M-5 fumed hydrophilic silica using a Cowles disperser for 5 minutes. 24.0 g of CELLOSIZE® HEC QP-4400H is added, and the mixture is stirred for another 5 minutes. 1.8 g of TERGITOL® NP-10 surfactant is added and the slurry is stirred for 1 more minute. The final slurry is 38.5% HEC. After standing three days, the slurries of examples 14–16 only exhibited modest settling (3–4 mm of clear fluid was noted on the top and the slurry was easily redispersed).

Examples 17–20

Interior all-acrylic semi-gloss with RHOPLEX® AC-417M acrylic latex at 3.5 pounds QP-4400H HEC (contained) per 100 gallons. The rheological performance of the three slurries in latex paints and the specular gloss properties of the dried paints were identical to that of the powdered QP-4400H (see table below).

TABLE 7

Rheological Performance

| Parameter | Example 17<br>Powdered QP-4400H | Example 18<br>Slurry from example 14 | Example 19<br>Slurry from example 15 | Example 20<br>Slurry from example 16 |
|---|---|---|---|---|
| Stormer viscosity | 89 KU | 90 KU | 90 KU | 90 KU |
| ICI viscosity | 1.4 P | 1.3 P | 1.4 P | 1.3 P |
| Sag resistance | 19 | 19 | 20 | 19 |
| Leneta leveling | 2 | 2 | 2 | 2 |
| Spatter resistance | 1 | 1 | 1 | 1 |
| 85 Sheen | 44.6 | 45.1 | 46.2 | 46.8 |
| 60 Gloss | 31.9 | 31.9 | 32.8 | 32.5 |

Example 21

A slurry is prepared by mixing 42.0 g of UCAR® Filmer IBT solvent and 3.0 g of BENTONE® SD-2 organobentonite clay using a Cowles disperser for 10 minutes at 2000 rpm. 18.0 g of NATROSOL® 250 H4BR HEC is added and mixed at 4000 rpm for 10 minutes, then 1.80 g of TERGITOL® NP-10 surfactant is added and the mixture is stirred at 4000 rpm for 10 minutes. The final mixture is a fluid tan slurry with a final HEC content of 27.8% and a UCAR® Filmer IBT content of 64.8%.

Example 22

Same procedure as example 21, except that BERMOCOLL® EBS 481 FQ EHEC was used instead of NATROSOL® 250 H4BR HEC. The final mixture is a fluid tan slurry with a final EHEC content of 27.8% and a UCAR® Filmer IBT content of 64.8%.

Examples 23–26

Exterior all-acrylic flat with UCAR® latex 624 acrylic latex at 4 pounds NATROSOL® HEC or BERMOCOLL® EHEC (contained) per 100 gallons. The rheological performance of the two slurries in latex paint was identical to that of the powdered ER-52M (see table below).

TABLE 8

Rheological Performance

| Parameter | Example 23<br>Powdered<br>250 H4BR | Example 24<br>Slurry<br>from<br>example 21 | Example 25<br>Powdered<br>EBS 481<br>FQ | Example 26<br>Slurry from<br>example 22 |
|---|---|---|---|---|
| Stormer viscosity | 82 KU | 86 KU | 88 KU | 89 KU |
| ICI viscosity | 1.0 P | 1.2 P | 1.0 P | 1.5 P |
| Sag resistance | 15 | 15 | 14 | 15 |
| Leneta leveling | 2 | 3 | 2 | 2 |
| Spatter resistance | 2 | 2 | 1 | 1 |

Example 27

A slurry is prepared by mixing 36.0 g of UCAR® butyl DIPROPASOL solvent and 3.0 g of BENTONE® SD-2 organobentonite clay using a Cowles disperser for 10 minutes at 2000 rpm. 24.0 g of CELLOSIZE® HEC QP-4400H is added and mixed at 4000 rpm for 10 minutes. The final mixture is a fluid tan slurry with a final HEC content of 38.1% and a UCAR® butyl DIPROPASOL content of 57.1%.

Example 28

A slurry is prepared by mixing 36.0 g of UCAR® 8 butyl DIPROPASOL solvent and 0.6 g of CAB-O-SIL® M-5 silica using a Cowles disperser for 10 minutes at 2000 rpm. 24.0 g of CELLOSIZE® HEC QP-4400H is added and mixed at 4000 rpm for 10 minutes, then 1.80 g of TERGITOL® NP-10 surfactant is added and the mixture is stirred at 4000 rpm for 10 minutes. The final mixture is a fluid tan slurry with a final HEC content of 38.5% and a UCAR® butyl DIPROPASOL content of 57.7%.

Example 29

Same procedure as example 28, except that 36.0 g of EASTMAN® DB acetate solvent was used instead of 36.0 g of of UCAR® butyl DIPROPASOL solvent. The final mixture is a fluid tan slurry with a final HEC content of of 38.5% and a of EASTMAN® DB acetate content of 57.7%. After standing three days, the slurries of examples 27–29 exhibited very little settling and remained free-flowing and fluid.

Example 30

A slurry is prepared by mixing 18.0 g of UCAR® Filmer IBT solvent and 1.5 g of BENTONE® SD-2 organobentonite clay using a Cowles disperser for 10 minutes at 2000 rpm. 12.0 g of hydroxyethyl guar is added and mixed at 4000 rpm for 10 minutes, then 0.9 g of TERGITOL® NP-10 surfactant is added and the mixture is stirred at 4000 rpm for 10 minutes. The final mixture is a viscous tan slurry with a final hydroxyethyl guar content of 37.0% and a UCAR® Filmer IBT content of 55.6%.

Examples 31–34

Interior flat with UCAR® latex 6379 vinyl-acrylic latex at 6 pounds hydroxyethyl guar (contained) per 100 gallons, and exterior all-acrylic flat with UCAR® latex 624 acrylic latex at 4 pounds hydroxyethyl guar (contained) per 100 gallons. The rheological performance of the slurry in the two latex paints was identical to that of the powdered hydroxyethyl guar (see table below).

TABLE 9

Rheological Performance

| Parameter | Example 31<br>Vinyl-acrylic with<br>UCAR ® 6379<br>Powdered<br>HE guar | Example 32<br>Slurry<br>from | Example 33<br>All-acrylic with<br>Powdered<br>HE guar | Example 34<br>UCAR ® 624<br>Slurry from<br>example 30 |
|---|---|---|---|---|
| Stormer viscosity | 86 KU | 86 KU | 94 KU | 95 KU |
| ICI viscosity | 1.2 P | 1.2 P | 1.6 P | 1.4 P |
| Sag resistance | 9 | 10 | 25 | 16 |
| Leneta leveling | 2 | 2 | 2 | 2 |
| Spatter resistance | 1 | 1 | 1 | 1 |

Example 35

A slurry is prepared by mixing 36.0 g of UCAR® Filmer IBT solvent and 3.0 g of BENTONE® SD-2 organobentonite clay using a Cowles disperser for 10 minutes at 2000 rpm. 24.0 g of CELLOSIZE® HEC QP-4400H is added and mixed at 400 rpm for 10 minutes, then 0.9 g of TERGITOL® NP-10 surfactant is added and the mixture is stirred at 4000 rpm for 10 minutes. The final mixture is a fluid tan slurry with a final HEC content of 37.6% and a UCAR® Filmer IBT content of 56.3%. The viscosity of this slurry was measured using a Haake viscometer, and was found to be about 170 cP at 1200 sec$^{-1}$ and about 615 cP at 10 sec$^{-1}$.

Example 36

The procedure of example 31 is repeated except using 0.60 g of CAB-O-SIL® M-5 silica instead of 3.0 g of BENTONE® SD-2 clay. The final mixture is a fluid tan slurry with a final HEC content of 39.0% and a UCAR® Filmer IBT content of 58.5%. The viscosity of this slurry was measured using a Haake viscometer, and was found to be about 125 cP at 1200 sec$^{-1}$ and about 370 cP at 10 sec$^{-1}$.

Example 37

A slurry is prepared by mixing 18.0 g of UCAR® Filmer IBT solvent and 0.30 g of CAB-O-SIL® M-5 silica using a Cowles disperser for 10 minutes at 2000 rpm. 12.0 g of CELLOSIZE® HM HEC 200 is added and mixed at 400 rpm for 10 minutes, then 0.9 g of TERGITOL® NP-10 surfactant is added and the mixture is stirred at 4000 rpm for 10 minutes. The final mixture is a fluid tan slurry with a final HMHEC content of 38.5% and a UCAR® Filmer IBT content of 57.7%.

Example 38

The procedure of example 37 is repeated except using 12.0 g of NATROSOL® Plus 330 HMHEC instead of 12.0 g of CELLOSIZE® HM HEC 200.

Example 39

A water-jacketed 250 ml beaker was charged with 93.6 g of UCAR® Filmer IBT and heated with the water jacket and circulating water bath to 60° C. While holding the solvent at 60° C., 4.90 g of BENTONE® SD-2 clay was added with stirring using a three paddle turbine stirrer and stirred for 10 minutes. The mixture was then cooled to 25° C., and 62.4 g of CELLOSIZE® HEC QP-4400H (W-4803-L, screened through a #40 mesh sieve) was added and stirred for 10 minutes at 25° C. Then, 2.34 g of TERGITOL® NP-10 surfactant was added, and the mixture was stirred for an additional 10 minutes at 25° C. The final product was a fluid tan slurry, with a nominal HEC content of 38.2% and a BENTONE® SD-2 clay content of 3.0%.

Examples 40–43

Exterior all-acrylic flat with UCAR® latex 624 acrylic latex at 6 pounds NATROSOL® Plus 330 HMHEC or CELLOSIZE® HM HEC 200 (contained) per 100 gallons. The rheological performance of the two slurries in latex paint was identical to that of the powdered HMHEC polymers (see table below).

TABLE 10

Rheological Performance

| Parameter | Example 40 Powdered HMHEC 200 | Example 41 Slurry from example 37 | Example 42 Powdered NATROSOL® Plus 330 | Example 43 Slurry from example 38 |
|---|---|---|---|---|
| Stormer viscosity | 93 KU | 93 KU | 103 KU | 105 KU |
| ICI viscosity | 1.7 P | 1.8 P | 1.8 P | 1.6 P |
| Sag resistance | 25 | 20 | 25 | 24 |
| Leneta leveling | 3 | 3 | 2 | 1 |
| Spatter resistance | 8 | 8 | 8 | 8 |

Although the present invention has been described with respect to specific aspects those skilled in the art will recognize that other aspects are intended to be included within the scope of the claims which follow.

For example, in addition to the cellulose ether described herein, one skilled in the art may use other water-soluble polysaccharides, including naturally occurring, biosynthesized and derivatized carbohydrate polymers or mixtures thereof. Such materials encompass high molecular weight polymers composed of monosaccharide units joined by glycosidic bonds. These materials may include, for example, the entire starch and cellulose families; pectin, chitosan; chitin; the seaweed products such as agar and carrageenan; alginate; the natural gums such as guar, e.g., hydroxyethyl guar, arabic and tragacanth; bio-derived gums such as xanthan; and the like. The description herein relating to the cellulose ethers would also apply to other polysaccharides.

What is claimed is:

1. A slurry composition comprising:
   (a) from about 1 to 75 weight percent, based on the total weight of the slurry, of a particulate, water-soluble, cellulose ether having a particle size of from about 0.01 to 1000 microns and a molecular weight of from about 10,000 to $2 \times 10^6$ grams per gram mole;
   (b) from about 25 to 99 weight percent, based on the total weight of the slurry, of an oxygenated, organic carrier which is at least substantially a non-solvent for the cellulose ether and which has from about two to about twelve carbon atoms per molecule; and
   (c) from about 0.1 to 10 weight percent, based on the total weight of the slurry, of a particulate thickening agent which is insoluble in the carrier;
   wherein the slurry composition
   (i) is substantially free of salt;
   (ii) is substantially free of water; and
   (iii) is stable for at least one week.

2. The composition of claim 1 wherein the oxygenated, organic carrier is effective to enhance the viscosification and film formation of a latex composition comprising the slurry.

3. The composition of claim 1 wherein the oxygenated, organic carrier is selected from the group consisting of ketones, carbonates, esters, ester alcohols, glycol ethers, glycols and mixtures thereof.

4. The composition of claim 1 wherein the cellulose ether is selected from the group consisting of hydroxyethyl cellulose, hydroxypropyl cellulose, methyl cellulose, hydroxypropyl methyl cellulose, hydroxyethyl methyl cellulose, hydroxy carboxylmethyl cellulose, and mixtures thereof.

5. The composition of claim 1 wherein the cellulose ether is hydrophobically modified with an alkyl, alkene, aryl, alkyl-aryl or alkene-aryl substituent.

6. The composition of claim 1 wherein the particulate thickener is selected from the group consisting of silicas, aluminas, clays and mixtures thereof.

7. The composition of claim 1 which further comprises from about 0.1 to 10 weight percent of a surfactant based on the total weight of the slurry.

8. A method of making a slurry composition comprising combining:
   (a) from about 1 to 75 weight percent, based on the total weight of the slurry, of a particulate, water-soluble, cellulose ether having a particle size of from about 0.01 to 1000 microns and a molecular weight of from about 10,000 to $2 \times 10^6$ grams per gram mole;
   (b) from about 25 to 99 weight percent, based on the total weight of the slurry, of an oxygenated, organic carrier which is at least substantially a non-solvent for the; cellulose ether and which has from about two to about twelve carbon atoms per molecule; and
   (c) from about 0.1 to 10 weight percent, based on the total weight of the slurry, of a particulate thickening agent which is insoluble in the carrier;
   wherein the slurry composition,
   (i) is substantially free of salt;
   (ii) is substantially free of water; and
   (iii) is stable for at least one week.

9. The method of claim 8 comprising dispersing the particulate thickening agent in the oxygenated organic carrier to form an initial dispersion and adding the cellulose ether to the initial dispersion to form the slurry.

10. A slurry composition comprising:
    (a) from about 1 to 75 weight percent, based on the total weight of the slurry, of a particulate, water-soluble, polysaccharide having a particle size of from about 0.01 to 1000 microns and a molecular weight of from about 10,000 to $2 \times 10^6$ grams per gram mole;
    (b) from about 25 to 99 weight percent, based on the total weight of the slurry, of an oxygenated, organic carrier which is at least substantially a non-solvent for the polysaccharide and which has from about two to about twelve carbon atoms per molecule; and
    (c) from about 0.1 to 10 weight percent, based on the total weight of the slurry, of a particulate thickening agent which is insoluble in the carrier;
    wherein the slurry composition
    (i) is substantially free of salt;
    (ii) is substantially free of water; and
    (iii) is stable for at least one week.

11. The composition of claim 1 which comprises from about 30 to 80 weight percent of the oxygenated, organic carrier based on the total weight of the slurry.

12. The composition of claim 1 which comprises from about 45 to 75 weight percent of the oxygenated, organic carrier based on the total weight of the slurry.

* * * * *